United States Patent
Kamali et al.

(10) Patent No.: US 12,306,833 B2
(45) Date of Patent: May 20, 2025

(54) ROBUST QUERY EXECUTION PLAN SELECTION USING MACHINE LEARNING WITH PREDICTIVE UNCERTAINTIES

(71) Applicant: International Business Machines Corporation, Armonk, NY (US)

(72) Inventors: Seyed Mohammad Amin Kamali, Orleans (CA); Calisto Zuzarte, Pickering (CA); Vincent Corvinelli, Mississauga (CA); Brandon Lewis Frendo, Markham (CA); Vasiliki Kantere, Ottawa (CA); Ning Wang, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/447,465

(22) Filed: Aug. 10, 2023

(65) Prior Publication Data
US 2025/0013641 A1   Jan. 9, 2025

Related U.S. Application Data

(60) Provisional application No. 63/510,914, filed on Jun. 29, 2023.

(51) Int. Cl.
*G06F 16/2453* (2019.01)
*G06F 11/34* (2006.01)

(52) U.S. Cl.
CPC .... *G06F 16/24542* (2019.01); *G06F 11/3409* (2013.01)

(58) Field of Classification Search
CPC ............................................... G06F 16/24542
(Continued)

(56) References Cited

U.S. PATENT DOCUMENTS

2005/0071331 A1 *   3/2005   Gao ................. G06F 16/24547
2006/0085375 A1 *   4/2006   Egan ................ G06F 16/24542
(Continued)

FOREIGN PATENT DOCUMENTS

CN          116028528 A        4/2023

OTHER PUBLICATIONS

F. Wolf, et al., "Robustness metrics for relational query execution plans," Proc. VLDB Endow., vol. 11, No. 11, Jul. 2018, pp. 1360-1372.
(Continued)

*Primary Examiner* — Muluemebet Gurmu
(74) *Attorney, Agent, or Firm* — CANTOR COLBURN LLP; Teddi Maranzano

(57) ABSTRACT

Aspects of the invention include techniques for robust query execution plan selection. A non-limiting example method includes training a model to estimate, for an input including a query and one or more plans, an execution time for each plan and a respective uncertainty of the execution time. A new query and a search space including a plurality of candidate plans are input to the model. Given an estimated distribution for the execution time of each candidate plan, a suboptimality risk is computed for each candidate plan. A plan of the plurality of candidate plans is selected according to a plan selection policy. The plan selection policy includes at least one of: selecting a plan by assuming that plans have higher costs proportional to an estimated standard deviation of their respective uncertainty; and selecting a plan with minimum risk using model uncertainty, data uncertainty, or a total uncertainty.

15 Claims, 5 Drawing Sheets

(58) Field of Classification Search
USPC .................................................. 707/714
See application file for complete search history.

(56) References Cited

U.S. PATENT DOCUMENTS

| | | | | |
|---|---|---|---|---|
| 2011/0105852 | A1* | 5/2011 | Morris ................ | G06Q 10/10 600/300 |
| 2019/0197163 | A1 | 6/2019 | Morris et al. | |
| 2019/0266272 | A1 | 8/2019 | Wolf et al. | |
| 2020/0272667 | A1 | 8/2020 | Ding et al. | |
| 2023/0101023 | A1* | 3/2023 | Jin .................... | G06Q 10/087 705/7.31 |
| 2023/0273925 | A1* | 8/2023 | Li ..................... | G06F 11/3419 707/713 |

OTHER PUBLICATIONS

A. Kendall et al., "What uncertainties do we need in Bayesian deep learning for computer vision?" in Proceedings of the 31st International Conference on Neural Information Processing Systems, Red Hook, NY, USA, Dec. 2017, 11 pages.

B. Lakshminarayanan et al., "Simple and Scalable Predictive Uncertainty Estimation using Deep Ensembles," in Advances in Neural Information Processing Systems, vol. 30. 2017, 12 pages.

D. M. Blei et al., "Variational Inference: A Review for Statisticians," J. Am. Stat. Assoc., vol. 112, No. 518, May 2018, pp. 1-41.

Dutt et al., "Plan Bouquets: A Fragrant Approach to Robust Query Processing," ACM Trans. Database Syst., vol. 41, No. 2, May 2016, p. 11:1-11:37.

Gal et al., "Bayesian convolutional neural networks with Bernoulli approximate variational inference." arXiv preprint arXiv:1506.02158 (2016), 12 pages.

Gawlikowski, Jakob, et al. "A survey of uncertainty in deep neural networks." Artificial Intelligence Review (2023): 1-77.

Goodfellow et al., "Deep Learning," Cambridge, Massachusetts: The MIT Press, 2015, 705 pages.

Hüllermeier et al., "Aleatoric and epistemic uncertainty in machine learning: an introduction to concepts and methods," Mach. Learn., vol. 110, No. 3, Mar. 2021, pp. 457-506.

J. R. Haritsa, "Robust query processing: mission possible," Proc. VLDB Endow., vol. 13, No. 12, Aug. 2020, pp. 3425-3428.

M. Abdar et al., "A review of uncertainty quantification in deep learning: Techniques, applications and challenges," Inf. Fusion, vol. 76, Dec. 2021, pp. 243-297.

S. Chaudhuri, "An Overview of Query Optimization in Relational Systems," in Proceedings of the Seventeenth ACM SIGACT-SIGMOD-SIGART Symposium on Principles of Database Systems, New York, NY, USA, 1998, pp. 34-43.

T. M. Mitchell, "Machine Learning". New York: McGraw-Hill, 1997. 421 pages.

Y. Gal et al., "Dropout as a Bayesian Approximation: Representing Model Uncertainty in Deep Learning," in Proceedings of the 33rd International Conference on Machine Learning, Jun. 2016, pp. 10 pages.

Y. Ioannidis and S. Christodoulakis, "On the Propagation of Errors in the Size of Join Results.," ACM SIGMOD, Apr. 1991, vol. 20, pp. 268-277.

R. Marcus et al., "Neo: a learned query optimizer," Proc. VLDB Endow., vol. 12, No. 11, 2019, pp. 1705-1718.

* cited by examiner

ROBUST QUERY EXECUTION PLAN SELECTION USING MACHINE LEARNING WITH PREDICTIVE UNCERTAINTIES

BACKGROUND

The present invention generally relates to relational database management, and more specifically, to computer systems, computer-implemented methods, and computer program products for providing a robust query execution plan selection using machine learning with predictive uncertainties.

A relational database management system (RDBMS) often relies on structured query language (SQL) to manage data stored in a relational database. An RDBMS may typically include single column statistics that are usually collected on individual columns in a so-called relation. A relation may include tuples and/or attributes that describe the relationship(s) and/or the defining feature(s) in a table or between tables in a relational database. For example, a relation can include data values on a table and the relational database may store the data values as relations or tables. A collection of relations or tables may be stored on a database as a relational model.

Queries can be executed against a relational database using an RDBMS. A query refers to a specific request or command issued to the RDBMS to retrieve, manipulate, and/or update data stored in a relational database. Queries allow users to interact with the database and to perform various operations such as retrieving specific records, filtering data based on certain criteria, aggregating information, joining tables, and modifying data. Queries are typically written using SQL, which provides a standardized syntax and set of commands to interact with the database.

While all query plans for a given query are equivalent in terms of their final output, each will vary in execution cost, which is the amount of time and resources needed to run a respective query. The cost difference across query plans can be several orders of magnitude large. Therefore, when a query is executed, a query optimizer (often itself a component/module of the RDBMS) analyzes the query and determines the most efficient execution plan. To determine the most efficient plan, the query optimizer examines alternative plans and searches for the cheapest one in terms of execution cost. The cheapest query plan is often referred to as the optimal query plan.

In a typical architecture, a query plan is constructed bottom-up by the plan operators as building blocks, with each operator associated with a certain estimated cost (e.g., an amount of hardware resources utilized, an elapsed time, etc.). The overall cost of a given plan is the accumulated cost resulting from all plan operators involved when suitably accounting for portions of the query that are executed (if, e.g., elapsed time is used to cost the query). To select an optimal query plan, a query optimizer uses a cost model to evaluate several alternative query plans in its search space. The plan with the minimum estimated cost is typically selected for executing the query.

SUMMARY

Embodiments of the present invention are directed to techniques for robust query execution plan selection. A non-limiting example method includes training a model to estimate, for an input including a query and one or more plans, an execution time for each plan and a respective uncertainty of the execution time. A new query and a search space including a plurality of candidate plans are input to the model. Given an estimated distribution for the execution time of each candidate plan, a suboptimality risk is computed for each candidate plan. A plan of the plurality of candidate plans is selected according to a plan selection policy. The plan selection policy includes at least one of: selecting a plan by assuming that plans have higher costs proportional to an estimated standard deviation of their respective uncertainty; and selecting a plan with minimum risk using model uncertainty, data uncertainty, or a total uncertainty. Advantageously, the query execution plan selection architecture described herein can select a plan having an ostensibly higher cost over other, "cheaper" high-variance plans when the estimation uncertainty of its respective predicted execution times is relatively low, according to user-defined and/or predetermined policies.

In some embodiments, one or more plans are pruned based on a pruning policy. The pruning policy can include pruning plans in the search space having model uncertainty or data uncertainty greater than predetermined thresholds. The pruning policy can include pruning plans in the search space having suboptimality risk greater than a predetermined threshold. Reducing the search space natively improve model performance.

In some embodiments, the pruning policy guarantees a final plan by preventing a plan from being pruned if there are no other candidate plans having one or more same properties as the respective plan. Guaranteeing a final plan in this manner ensures finality and execution of the new query.

In some embodiments, one of a given sample and additional training data are nominated for retraining the model according to the model uncertainties. Retraining can be triggered by model and/or data drift to retain model accuracy.

In some embodiments, suboptimality risk is defined as a ratio of a cost of the respective execution plan to a cost of an optimal execution plan. In this manner, plans can be evaluated on a cost basis against other candidate plans.

In some embodiments, the new query is executed using the selected plan of the plurality of candidate plans. In some embodiments, the new query is executed against a relational database using a relational database management system. Advantageously, executing the new query in this manner ensures execution of the query using a plan satisfying the plan selection policy.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
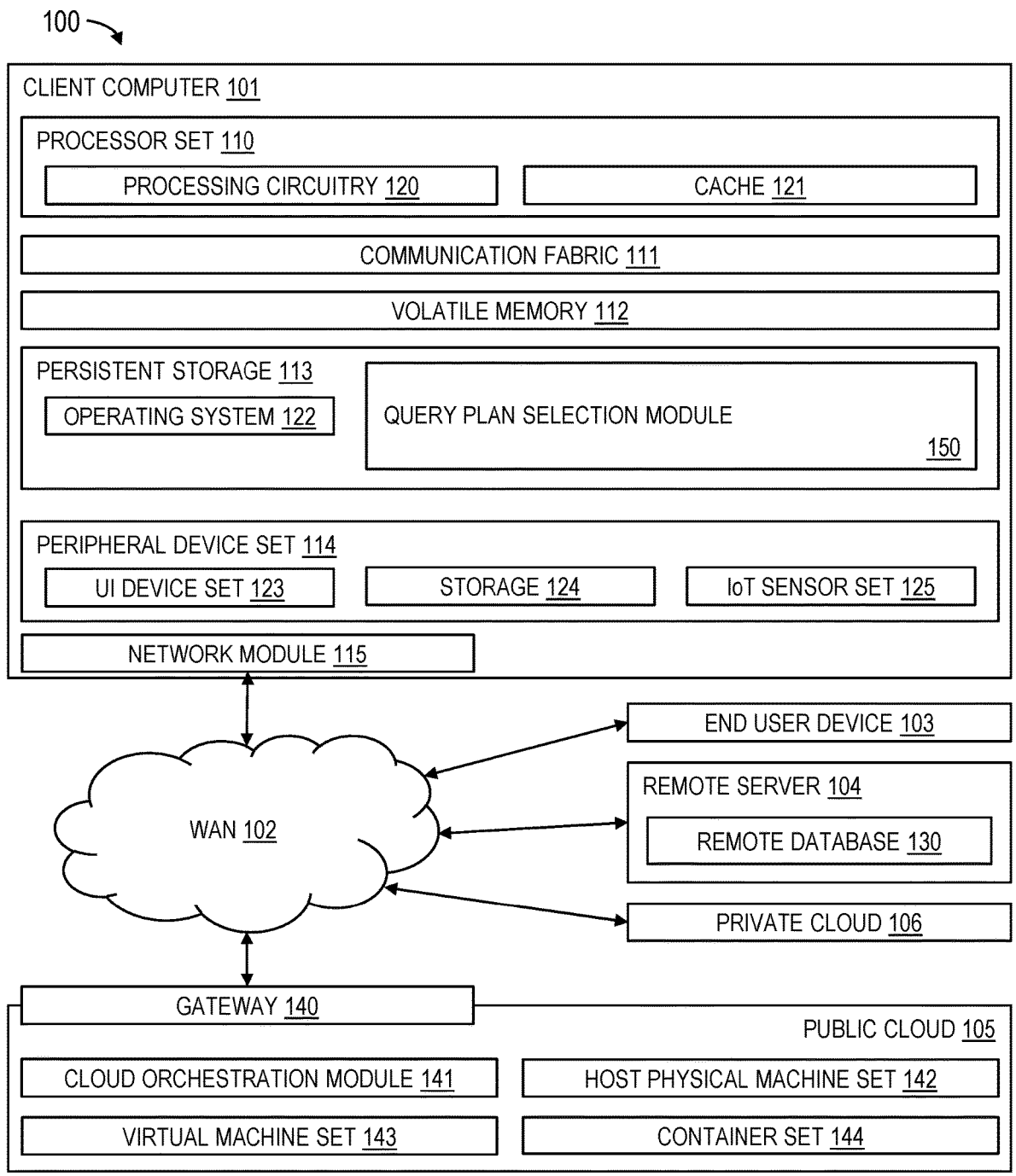
FIG. 1 depicts a block diagram of an example computing environment for use in conjunction with one or more embodiments.

The diagrams depicted herein are illustrative. There can be many variations to the diagram or the operations described therein without departing from the spirit of the invention. For instance, the actions can be performed in a differing order or actions can be added, deleted or modified.

In the accompanying figures and following detailed description of the described embodiments of the invention, the various elements illustrated in the figures are provided with two or three-digit reference numbers. With minor exceptions, the leftmost digit(s) of each reference number correspond to the figure in which its element is first illustrated.

DETAILED DESCRIPTION

Queries can be executed against a relational database using a relational database management system (RDBMS). When a query is received by the RDBMS, a query optimizer (often itself a component/module of the RDBMS) analyzes the query and determines the most efficient execution plan. Selecting an optimal query plan is challenging due to several factors. The cost model is often complex, relying on various parameters about the data that flows through the operators as well as the resources available for processing the data. The data parameters themselves are usually not known at compile time and are often estimated. In particular, the costs estimated by a cost model may have poor correlations with the execution time of actual queries due, in part, to inaccurate input parameters, incomplete information, and the effects of simplifying assumptions made for making the estimations.

State-of-the-art query optimizers use so-called expected optimality as the only or primary criteria for choosing a query plan. A plan's expected optimality is determined by the underlying estimated costs of the plan. Observe that, by choosing an optimal plan based only on costs, the optimizer assumes both that the estimated costs are sufficiently accurate, and that the estimated cost inaccuracies for different plans are consistent. As will be discussed in further detail herein, these assumptions can result in the optimizer choosing plans that are not robust.

A robust query processing system limits maximum suboptimality. In the context of query optimization, suboptimality is a plan property defined as the ratio of the cost of the execution plan to the cost of the optimal execution plan. This ratio determines the worst-case regression caused by picking the plan. The main challenge in achieving robust performance is the sensitivity of the cost estimates to inaccurate parameter estimations. For example, the estimated selectivity of a predicate, which is a significant contributing factor to the cost, can be subject to large errors leading to inaccurate cost estimation for the corresponding operator. This error is propagated and sometimes amplified through the execution plan causing large cost misestimations at the root of the plan. Depending on the characteristics of the plan and the patterns of error propagation, robustness with respect to these errors may vary. This means a non-robust plan (also referred to as a risky plan) can have a substantially larger cost than expected if the actual selectivities (or other parameters) are different, even slightly, than what was estimated at compile time. In contrast, a robust plan does not have abrupt changes and the cost stays reasonable in a wider range of parameters. Therefore, choosing a good plan using the classic approaches, such as the optimizer's cost modeling approach, heavily relies on having accurate parameter estimations, which remains an unsolved problem. This means that a plan picked by the optimizer is very likely to be suboptimal at runtime, where this suboptimality is not bounded in any way. In other words, picking plans solely based on the estimated cost cannot guarantee robustness.

This disclosure introduces new methods, computing systems, and computer program products for providing a robust query execution plan selection using machine learning with predictive uncertainties. In some embodiments, given a query and various possible query execution plans, a learned cost model is trained that predicts execution times (i.e., the cost) for each plan. However, rather than relying on a single point estimate for each plan's expected cost, predictive uncertainties are quantified that estimate the parameters of a probability distribution function of the predicted execution times for each plan. An optimal plan can then be selected using the predicted execution times for each plan and the predictive uncertainties (also referred to as execution uncertainties, or execution variances) for those execution times according to one or more predetermined policies. In some embodiments, a policy for selecting a plan includes assuming that the plans have higher costs proportional to the estimated standard deviations of the respective estimated execution times. In some embodiments, a policy for selecting a plan includes selecting a plan with minimum suboptimality risk using either model, data, and/or total uncertainty. In some embodiments, risky plans are pruned based on predetermined conditions. In some embodiments, pruning removes plans in the search space with model or data uncertainty greater than predetermined thresholds. In some embodiments, pruning removes plans in the search space with a suboptimality risk greater than a predetermined threshold. In some embodiments, the model uncertainties are used to nominate a given sample (or additional training data) for retraining the model.

A query execution plan selection architecture that leverages predictive uncertainties in accordance with one or more embodiments described herein offers various technical advantages over prior approaches to query execution optimization. Unlike prior approaches, the query execution plan selection architecture described herein can select a plan having an ostensibly higher cost over other, "cheaper" high-variance plans when the estimation uncertainty of its respective predicted execution times is relatively low. In other words, higher-risk, relatively cheap plans can be discounted against lower-risk, relatively expensive plans. Other advantages are possible. Notably, selecting a query plan in this manner does not require any new extensions to preexisting runtime engines, and can be implemented with negligible compilation overhead (limited, e.g., to additional inference calls to the model).

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Referring now to FIG. 1, computing environment 100 contains an example of an environment for the execution of at least some of the computer code involved in performing the inventive methods, such as query plan selection module 150 (also referred to herein as block 150). In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

It is to be understood that the block diagram of FIG. 1 is not intended to indicate that the computing environment 100 is to include all of the components shown in FIG. 1. Rather, the computing environment 100 can include any appropriate fewer or additional components not illustrated in FIG. 1 (e.g., additional memory components, embedded controllers, modules, additional network interfaces, etc.). Further, the embodiments described herein with respect to the computing environment 100 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 2:
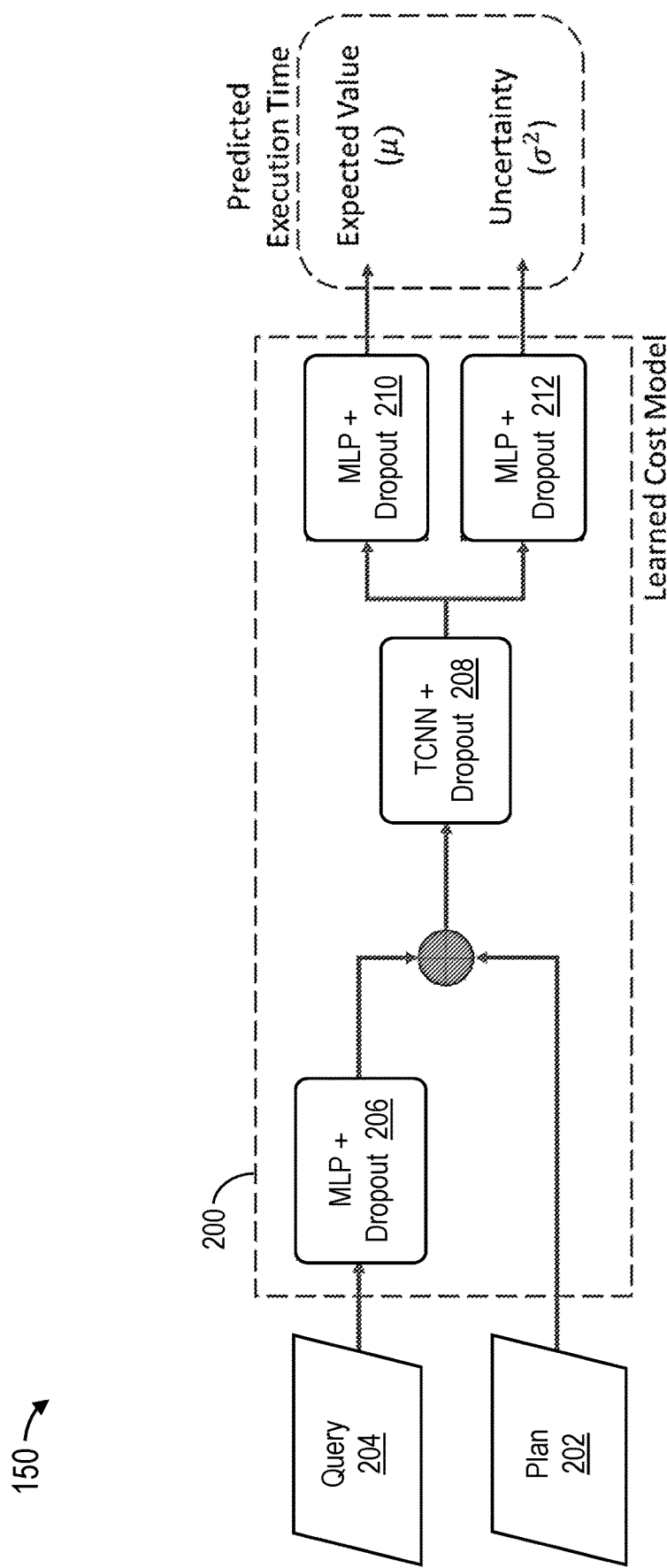
FIG. 2 depicts a block diagram of the query plan selection module of FIG. 1 in accordance with one or more embodiments.
Figure 3:
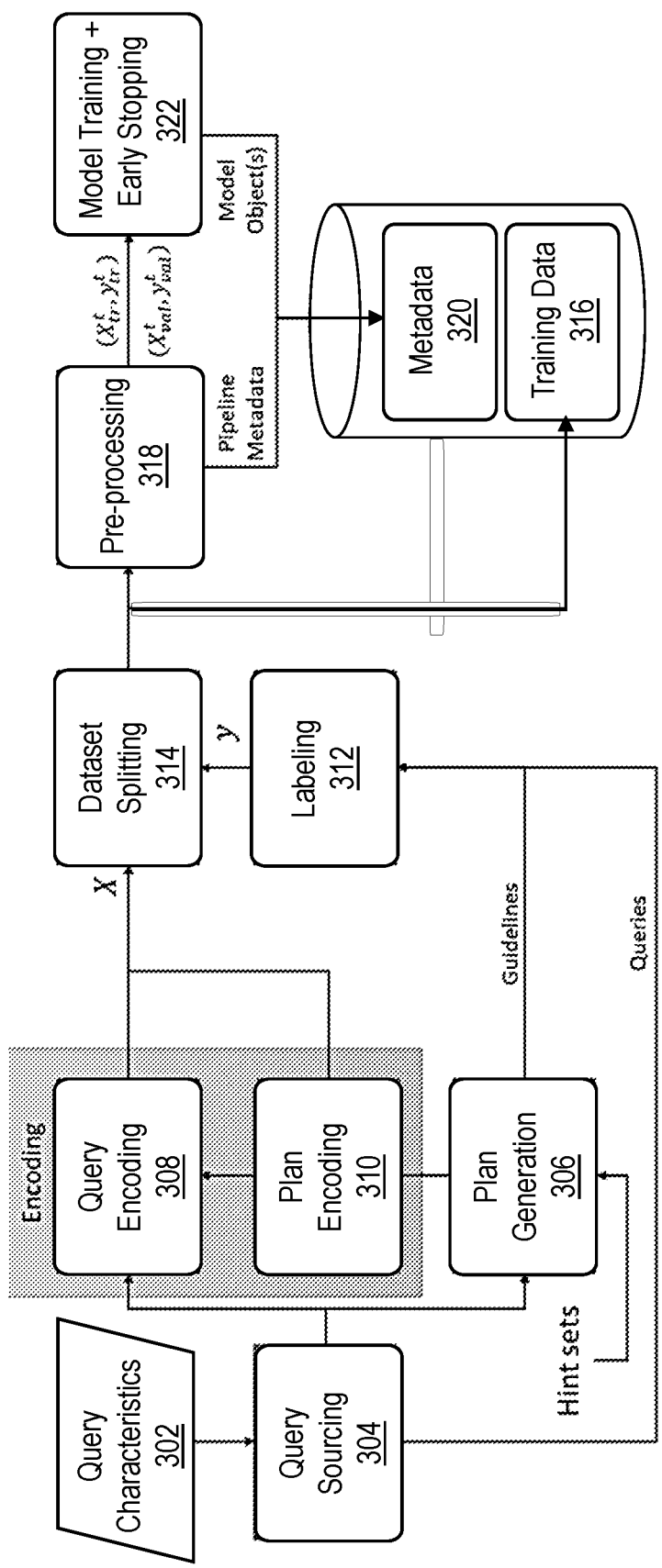
FIG. 3 depicts a block diagram of a training process for the query plan selection module of FIG. 1 in accordance with one or more embodiments.

Systems for providing a robust query execution plan selection using machine learning with predictive uncertainties are now described with reference to FIGS. 2, 3, and 4. FIG. 2 depicts a block diagram of components of the query plan selection module 150 of FIG. 1 according to one or more embodiments described herein. In some embodiments, the query plan selection module 150 includes a learned cost model 200 that is trained to predict an execution time (here, the expected value µ) of a plan 202 for a query 204, as well as the associated predictive uncertainty (here, the uncertainty $\sigma^2$) for the respective plan 202.

In some embodiments, query level information (e.g., query 204) is processed using one or more fully connected layers of a first multi-layer perceptron (MLP) 206. The resultant vector is combined with the plan level information (e.g., plan 202) and fed to a stack of tree-convolutional neural nets (TCNNs) 208.

In some embodiments, the output vector of the TCNN 208 is fed to two branches of MLPs (e.g., a second MLP 210 and a third MLP 212). In some embodiments, the second MLP 210 predicts the mean execution time (the expected value µ) and the third MLP 212 predicts the variance in the execution time (the uncertainty $\sigma^2$). Construction of the learned cost model 200 is discussed in greater detail herein.

Building a Learned Cost Model
Uncertainty Modeling

Bayesian inference is a powerful framework for understanding predictive uncertainties. In this framework, model uncertainty can be formalized as a probability distribution over the model parameters θ given training data D. Model uncertainty is formalized as a probability distribution over the model outputs y* given a parameterized model $f_\theta$ and an input sample x*. The predictive distribution can then be obtained by inference by marginalization according to Equation (1).

$$p(y^* | x^*, D) = \int \underbrace{p(y^* | x^*, \theta)}_{Data} \underbrace{p(\theta | D)}_{Model} d\theta \qquad (1)$$

In other words, the second term p(θ|D) in Equation (1) describes the variability inherent to the model, while the first term p(y*|x*,θ) describes the variability inherent to the outputs regardless of the model parameters. While p(θ|D) cannot be computed analytically, it can be approximated by variational parameters q(θ). This forms the basis for Bayesian neural networks (BNNs). BNN-based approaches are proposed as an extension of standard neural networks to model predictive uncertainties and can model network parameters as variables with joint probability distributions (usually Gaussian) and aim at inferring the parameters of this distribution (in the case of Gaussian, mean and covariance matrix).

Inferring the parameters can be done by minimizing the Kullback-Leibler (KL) divergence, which quantifies the level of dissimilarity between the two distributions q(θ) and p(θ|D), according to Equation (2):

$$KL(q(\theta) \| p(\theta|D)) = \mathbb{E}_{\theta \sim q(\theta)}[\log(q(\theta))] - \mathbb{E}_{\theta \sim q(\theta)}[\log(p(\theta|D))] \qquad (2)$$

where all expectations are taken with respect to q(θ). The approximation q*(θ) obtained in this way is the setting from the variational family q(O) which is closest to the posterior p(θ|D). Computation of the above KL divergence, however, is intractable since the second term log (p(θ|D)) requires computing log(p(D)). This can be made explicit by expanding Equation (2):

$$KL(q(\theta) \| p(\theta|D)) = \qquad (2^*)$$
$$\mathbb{E}_{\theta \sim q(\theta)}[\log(q(\theta))] - \mathbb{E}_{\theta \sim q(\theta)}[\log(p(\theta, D))] + \log(p(D))$$

Observe that, since log(p(D)) is constant with respect to q(θ), instead, a proxy function is optimized which can be referred to as the evidence lower bound (ELBO), denoted by Equation (3).

$$ELBO(q) = \mathbb{E}_{\theta \sim q(\theta)}[\log(p(\theta, D))] - \mathbb{E}_{\theta \sim q(\theta)}[\log(q(\theta))] \qquad (3)$$

Note that maximizing ELBO is equivalent to minimizing the KL divergence. The idea of inferring p(θ|D) from a family of variational distributions q(θ) by the above optimization is referred to as variational inference (VI). In deep learning, loss functions such as cross-entropy for classification tasks and mean squared error for regression tasks are inspired by or related to maximizing the log-likelihood for an assumed distribution.

Quantifying Aleatoric (Data) Uncertainty

A neural net can be designed with a Gaussian prior using known techniques to predict the parameters of the normal distribution. In other words, a neural net can be trained to not only predict the conditional expected value, but also the conditional variance of the target given in the training data and input sample. In some embodiments, this is done by adding a second branch to the output of the neural net that predicts the variance. Then optimizing the following loss function, denoted by Equation (4), corresponds to maximizing the log-likelihood with a Gaussian prior:

$$\text{Loss} = \frac{1}{N}\sum_{i=1}^{N}\left(\frac{\log \hat{\sigma}_i^2}{2} + \frac{(y_i - \hat{\mu}_i)}{2\hat{\sigma}_i^2} + \frac{1}{2}\log 2\pi\right) \quad (4)$$

where $\hat{\mu}_i$ is plugged in from the first branch of the output layer and $\hat{\sigma}_i^2$ is plugged in from the second one, and $y_i$ is plugged in from the labels. This is in line with the variational inference framework discussed previously.

Note that maximizing the log-likelihood can be viewed as minimizing the dissimilarity between the empirical distribution defined by the training set and the model distribution, with the degree of dissimilarity measured by the KL divergence according to Equation (5):

$$KL(p(\theta|D) \| q(\theta)) = \mathbb{E}_{\theta \sim p(\theta|D)}[\log(p(\theta|D))] - \mathbb{E}_{\theta \sim p(\theta|D)}[\log(q(\theta))] \quad (5)$$

where $p(\theta|D)$ represents the distribution of the underlying data generating process, and $q(\theta)$ represents the approximated distribution by the model. The term $\mathbb{E}_{\theta \sim p(\theta|D)}[\log(p(\theta|D))]$ is a function of the data generating process, not the model. Therefore, minimization of KL divergence comes down to maximization of the term $\mathbb{E}_{\theta \sim p(\theta|D)}[\log(q(\theta))]$, which is the cross-entropy $H(p(\theta|D), q(\theta))$ of the distribution represented by the model and the true distribution of the data generating process. Thus, given multiple predictions for $\mu$ and $\sigma^2$, one can combine the $\sigma^2$ values into one estimate for data uncertainty $U_d$ according to Equation (6).

$$U_d = \mathbb{E}[\text{Var}(y|x^*, D)] = \frac{1}{T}\sum_{t=1}^{T}\hat{\sigma}_t^2 \quad (6)$$

Quantifying Epistemic (Model) Uncertainty

BNNs aim at inferring the probability distribution over the model parameters. At inference time, the values of the weights are drawn from the corresponding distributions. Since computing the precise posterior distributions of model weights that characterize model uncertainty is intractable, approximate variational techniques can be used.

One of the most prominent methods in this category is approximate variational inference by Monte Carlo (MC) Dropout. In this method, the neural network is trained by applying dropout on hidden layer nodes with a Bernoulli distribution. Then at inference time, dropout is again applied randomly to the hidden layer nodes, resulting in variations in the weight matrices, hence in the predicted values. Dropout is shown to be mathematically equivalent to an approximation of Bayesian variational inference. The inference process comes down to sampling T weights $\theta_t$ from the approximate posterior $q(\theta)$ and applying Monte Carlo integration to get the predictive distribution, denoted by Equation (7).

$$p(y^*|x^*, D) = \int p(y^*|x^*, \theta)\, p(\theta|D)\, d\theta \approx \quad (7)$$

$$\int p(y^*|x^*, \theta)\, q(\theta)\, d\theta \approx \frac{1}{T}\sum_{t=1}^{T} p(y^*|x^*, \hat{\theta}_t) = q(y^*|x^*)$$

This process is referred to as Monte Carlo Dropout. Note that with a Gaussian prior, this corresponds to combining multiple Gaussian distributions $\{\mathcal{N}(\mu_{\theta_t}, \sigma^2_{\theta_t})\}T, t=1$ into one $\mathcal{N}(\hat{\mu}, \hat{\sigma}^2)$. Given each draw of model weights results in two estimated parameters, we have a set of parameter estimates $\{[\hat{\mu}_t, \hat{\sigma}^2_t]\}T, t=1$. The predicted mean will be given by Equation (8).

$$\hat{\mu} = \mathbb{E}_{y \sim p(y|x^*, D)}[y] \approx \frac{1}{T}\sum_{t=1}^{T}\hat{\mu}_t \quad (8)$$

The variance of K predictions obtained in this way ($\hat{\mu}_i$; $i \in \{1, \ldots, K\}$) determines the model uncertainty $U_m$ according Equation (9).

$$U_m = \text{Var}(\mathbb{E}[(y|x^*, D)]) = \quad (9)$$

$$\mathbb{E}[(y|x^*, D)^2] - \mathbb{E}[(y|x^*, D)]^2 = \frac{1}{T}\sum_{t=1}^{T}\hat{\mu}_t^2 - \left(\frac{1}{T}\sum_{t=1}^{T}\hat{\mu}_t\right)^2$$

Quantifying Total Predictive Uncertainty

The total predictive variance can be calculated from data uncertainty and model uncertainty according to Equation (10).

$$U_t = \text{Var}_{y \sim p(y|x^*, D)}[y] = \quad (10)$$

$$\mathbb{E}[\text{Var}(y|x^*, D)] + \text{Var}(\mathbb{E}[(y|x^*, D)]) = \mathbb{E}[\text{Var}(y|x^*, D)] +$$

$$\mathbb{E}[(y|x^*, D)^2] - \mathbb{E}[(y|x^*, D)]^2 \approx \underbrace{\frac{1}{T}\sum_{t=1}^{T}\hat{\sigma}_t^2}_{\text{Data uncertainty}} + \underbrace{\frac{1}{T}\sum_{t=1}^{T}\hat{\mu}_t^2 - \left(\frac{1}{T}\sum_{t=1}^{T}\hat{\mu}_t\right)^2}_{\text{Model uncertainty}}$$

The first term in Equation (10) $\mathbb{E}[\text{Var}(y|x^*, D)]$ represents the uncertainty inherent to the data, which is not reducible, while the second term $\text{Var}(\mathbb{E}[y|x^*, D])$ represents the uncertainty rooted in model parameters. Note that the second term reduces to zero when estimates $\{\hat{\mu}_t | t=1, \ldots T\}$ are identical, which means there is no disagreement between the models defined by sampled weights.

In some embodiments, for capturing the model uncertainty, the Dropout method described previously is used due to its simplicity, scalability, and very low training overhead while benefiting from the mathematically grounded framework of BNNs for reasoning about model uncertainty. Other techniques, such as Deep Ensembles, can be used too, and all such configurations are within the contemplated scope of this disclosure.

Recognizing and Quantifying Risk

In some embodiments, the learned cost model 200 is trained to estimate, in response to receiving a query and one or more plans, the parameters of the probability distribution function of the estimated execution time for each plan rather than a point estimate for each plan's expected value. In some embodiments, the learned cost model 200 is trained to estimate plan costs with model and data uncertainty (i.e., to estimate plan risks).

In some embodiments, the total risk of a plan can be quantified by the total predictive uncertainty $U_t$, itself the summation of model uncertainty $U_m$ and data uncertainty $U_d$.

As discussed previously, in some embodiments, the output vector of the TCNN 208 is fed to two branches of MLPs (e.g., a second MLP 210 and a third MLP 212). In some embodiments, the second MLP 210 predicts the mean execution time (the expected value $\mu$) and the third MLP 212 predicts the variance in the execution time (the uncertainty $\sigma^2$). As further shown in FIG. 2, dropouts can be applied to one or more of the MLPs 206, 210, 212 as well as to the TCNN 208 to enable variational inference. In this manner, multiple predictions for the expected value (e.g., $\mu_1 \ldots \mu_k$) and uncertainty (e.g., $\sigma_1 \ldots \sigma_k$) can be obtained using a single model. From these multiple predictions, model uncertainty $U_m$, data uncertainty $U_d$, and total predictive uncertainty $U_t$ can be obtained according to Equations (11), (12), and (13), respectively.

$$U_m = \frac{1}{K}\sum_{i=1}^{K}(\hat{\mu}_i^2) - \left(\frac{1}{K}\sum_{i=1}^{K}\hat{\mu}_i\right)^2 \quad (11)$$

$$U_d = \frac{1}{K}\sum_{i=1}^{K}(\hat{\sigma}_i^2) \quad (12)$$

$$U_t = \frac{1}{K}\sum_{i=1}^{K}(\hat{\sigma}_i^2 + \hat{\mu}_i^2) - \left(\frac{1}{K}\sum_{i=1}^{K}\hat{\mu}_i\right)^2 \quad (13)$$

Plan Selection Risk

In some embodiments, the query plan selection module 150 is further configured to estimate plan selection risk. Selecting a plan over another plan or set of plans introduces risks that are related to both the risk of each individual plan as well as the risk associated with their estimated costs. To illustrate, consider various scenarios where all optimal plans have an expected cost of 8, while the alternative plan(s) has a slightly higher cost of 10. The difference between the scenarios is the standard deviation of the probability distributions. The standard deviation denotes the uncertainty of the expected cost, as described previously. Consider further that the cost for the optimal plan is denoted by $C(X) \sim \mathcal{N}(\mu_x, \sigma^2_x)$ and the cost for the alternative plan is denoted by $C(Y) \sim \mathcal{N}(\mu_y, \sigma^2_y)$. Denote the covariance between $C(X)$ and $C(Y)$ as $cov(x,y)$. Then, the probability of the alternative plan actually being cheaper than the optimal plan at runtime can be denoted by Equation (14).

$$R(p_X, p_Y) = P(C(X) - C(Y) > 0) \quad (14)$$

where R(pX,pY) represents the risk of picking plan X over plan Y.

Note that the difference W between C(X) and C(Y) can be determined according to Equation (15).

$$W = C(X) - C(Y) \sim \mathcal{N}(\mu_x - \mu_y, \sigma_x^2 + \sigma_y^2 - 2cov(x,y)) \quad (15)$$

For ease of illustration, let X and Y be independent variables (i.e., assume independence, revisited later), such that cov(x,y)=0. Then, the probability of C(X)−C(Y)>0 can be obtained by computing the z-score for C(X)−C(Y)=0 according to Equation (16).

$$zscore = \frac{0 - (\mu_x - \mu_y)}{\sqrt{\sigma_x^2 + \sigma_y^2}} = \frac{\mu_y - \mu_x}{\sqrt{\sigma_x^2 + \sigma_y^2}} \quad (16)$$

Observe that, in all scenarios, $\mu_x=8$, $\mu_y=10$, and $\mu_y-\mu_x=2$. Table 1 outlines the computation of the risk associated with choosing the optimal plan (that is, the likelihood of the expected optimal plan being suboptimal) for four example scenarios a, b, c, and d.

TABLE 1

Computation of Risks Associated with Selecting the Optimal Plan at Different Uncertainty Levels

| Scenario | $\sigma_x$ | $\sigma_y$ | $\sigma_r = \sqrt{\sigma_x^2 + \sigma_y^2}$ | z-score | P(X − Y > 0) (Risk) |
|---|---|---|---|---|---|
| a | 1 | 1 | $\sqrt{2}$ | ≈1.41 | ≈7.9% |
| b | 1 | 4 | $\sqrt{17}$ | ≈4.12 | ≈31.6% |
| c | 4 | 1 | $\sqrt{17}$ | ≈4.12 | ≈31.6% |
| d | 4 | 4 | $\sqrt{32}$ | ≈5.65 | ≈36.3% |

Note that the computed risk factors shown in Table 1 are consistent with the intuition that high-variance "cheap" plans can be suboptimal in some/many scenarios.

In some embodiments, the computation of risks can be generalized to compute the risk for choosing the optimal plan in the presence of several alternative plans. In some embodiments, the average risk of picking a target plan over any other plan in the search space is determined according to Equation (17):

$$R(p_i) = \frac{1}{S-1}\sum_{j=1, j \neq i}^{S-1} R(p_i, p_j) \quad (17)$$

where S is the total number of plans in the search space, $R(p_i)$ is the average risk of picking the plan $p_i$ over every other S−1 plan in the search space, and $R(p_i,p_j)$ is the risk of picking the plan $p_i$ over plan $p_j$. Note that, advantageously, this risk factor can be computed using either model or data uncertainty for σ values. The earlier will give the risk rooted in modeling limitations while the latter gives the risk rooted in the plans themselves.

Revisiting Independence

When X and Y are not fully independent variables (refer to Equation (15) above), the covariance component cov(x,y) does not drop out, but is instead cov(x,y)=E(C(X)·C(Y))−E(C(X))E(C(Y)). Observe that, in this scenario, an accurate estimation of the risk associated with selecting plan X over plan Y would require determining the probability distribution of the cost for each plan as well as the pairwise joint distribution (C(X)·C(Y)). While capturing the joint distribution of C(X)·C(Y) is possible, assuming independence (e.g., cov(x,y)=0) can still be a viable option in this scenario. This assumption results in overestimating the risk by increasing the variance of C(X)−C(Y). However, the typical correlations can be captured empirically and used to adjust the overestimated risks obtained by making the independence assumption.

Plan Selection and Pruning Strategies Based On Risk

Given the model uncertainty $U_m$ and data uncertainty $U_d$ obtained previously, various alternative plan selection strategies can be designed. Each strategy may account for risk rooted in model or data uncertainties differently, as desired. Here two embodiments of such strategies are presented while several other strategies can be designed in the same manner. All such configurations are within the contemplated scope of this disclosure.

Conservative Plan Selection

Given the expected execution times and plan and estimation uncertainties for a query (refer above), in some embodiments, the query plan selection module 150 is configured to assume that plans have higher costs proportional to their estimated standard deviation. In other words, given S plans in the search space, where the plan $p_i|i \in \{1, \ldots, S\}$ has cost distribution $C(p_i) \sim \mathcal{N}(\mu_{pi}, \sigma^2_{pi})$, rather than picking the plan with minimum $\mu_{pi}$, a so-called conservative strategy can be employed to pick the plan with minimum $\mu_{pi} + f \times \sigma_{pi}$, where f is a parameter that is tuned on a validation set. This strategy can be implemented using either model or data uncertainty or a combination of the two. The advantage of this strategy is low computational overhead. Its disadvantage is its reliance on tuning parameter f, and the possibility of overfitting to the validation set.

Plan Selection by Suboptimality Risk

In some embodiments, the query plan selection module 150 is configured to select plans according to suboptimality risk. This strategy computes the suboptimality risk $R(p_i)$ (refer above) for every plan $p_i|i \in \{1, \ldots, S\}$ in the search space of size S. The plan with minimum $R(p_i)$ is selected for executing the query. This strategy can be implemented using either model or data uncertainty or a combination of the two. The advantage of this method is that it is non-parametric and less prone to over-fitting. Its disadvantage is its computational overhead.

Search Space Pruning by Plan and Estimation Risks

In some embodiments, the query plan selection module 150 is configured to prune the search space according to plan and estimation risks. In some embodiments, the plans in the search space with either of the uncertainties beyond predetermined thresholds ($\varphi_{mu}$ and $\varphi_{du}$, respectively) are pruned. Alternatively, or in addition, a certain fraction ($f_u$) of plans with the highest uncertainties of either type can be eliminated from the search space. Choosing the final plan from the remaining plans still relies on the learned cost (expected execution time) and/or the classic cost (optimizer cost). In some embodiments, pruning is done in a way to guarantee that there will be a final plan. A plan is not pruned if there is no other plan with the same set of properties (e.g., order or partitioning). This is a parametric strategy given the thresholds $\varphi_{mu}$, $\varphi_{du}$, and $f_u$ need to be tuned using a validation set. It has low computational overhead, but it is prone to overfitting.

Search Space Pruning by Suboptimality Risk

In some embodiments, the query plan selection module 150 is configured to prune the search space according to suboptimality risk. In some embodiments, the search space can be pruned using the average risk of suboptimality, which itself can be computed for every plan in the search space. In this strategy, plans with suboptimality risk beyond a predetermined threshold (($\varphi_{sor}$) are eliminated. Alternatively, or in addition, a predetermined fraction ($f_{sor}$) of plans with the highest suboptimality risk are pruned. In some embodiments, pruning is done in a way to guarantee that there will be a final plan. A plan is not pruned if there is no other plan with the same properties (like order or partitioning). This strategy is parametric as the parameters $\varphi_{sor}$ and $f_{sor}$ must be determined by tuning using a validation set. It has low computational overhead, but it is prone to overfitting.

Model Training Pipeline

Model training for the query plan selection module 150 and/or the learned cost model 200 can be done in many different ways with no impact on the application of the above notions, as long as the model architecture follows the above guidelines to enable capturing uncertainty values. One embodiment of the training process is illustrated in FIG. 3. In this embodiment, input queries can be either generated synthetically based on characteristics of interest (i.e., made via query sourcing 304 using query characteristics 302), or captured from the workload (i.e., received by query sourcing 304).

In some embodiments, a set of plans are generated (plan generation 306) for each query using hint sets that either enable or disable certain plan operators (e.g. enable nested loop join, disable index access, etc.). These hint sets allow to diversify the plans used for training in such a way that local optimums which can potentially be the true optimum are included in the training data. Plans can be generated by other means too (e.g., by using a random plan generator).

In some embodiments, the queries are encoded (query encoding 308) into vectors of numeric values that are consumable by machine learning architectures (e.g., the learned cost model 200). The encoding must capture information about the base tables, local predicates, join predicates, correlations, skewness of predicate columns, etc. In some embodiments, the plans are also encoded (plan encoding 310) into vector trees where each node of the plan tree is transformed into a vector containing information about the operator type and the tables accessed.

In some embodiments, the resulting encodings are used as input datasets (X). Each query/plan combination is executed, and the execution time is measured and collected as labels (y) (labeling 312). The dataset (including the inputs x and the labels y) is split (dataset splitting 314) to form the training data 316 and validation datasets (($X_{tr}$, $y_{tr}$, $X_{val}$, $y_{val}$)).

In some embodiments, the datasets then go through preprocessing 318, such as normalization and standardization, to provide input for the model training step (($X^t_{tr}$, $y^t_{tr}$, $X^t_{val}$, $y^t_{val}$)). The statistics used for each transformation can be captured from the training data only and used for both training and validation data. This consideration is necessary to avoid signal leakage from training to validation. In some embodiments, these statistics are stored as the model metadata 320 to be used later for inference. Finally, the model is trained using the training data, by the parameters obtained from tuning using the validation set (model training and early stopping 322). Early stopping can be optionally used to avoid over-fitting (model training and early stopping 322).

Model Inference, Feedback, and Retraining Pipelines

The learned cost model 200, once trained, can be used for various purposes. In some embodiments, the prediction(s) made by the learned cost model 200 is used to compute the uncertainty measures and suboptimality risk, which in turn are used by a plan selection strategy, as discussed previously. In addition, data and model uncertainties can be used to nominate a given sample for retraining, while the data uncertainty can additionally be used to identify and avoid risky plans. One embodiment of such a process is illustrated in FIG. 4.

Figure 4:
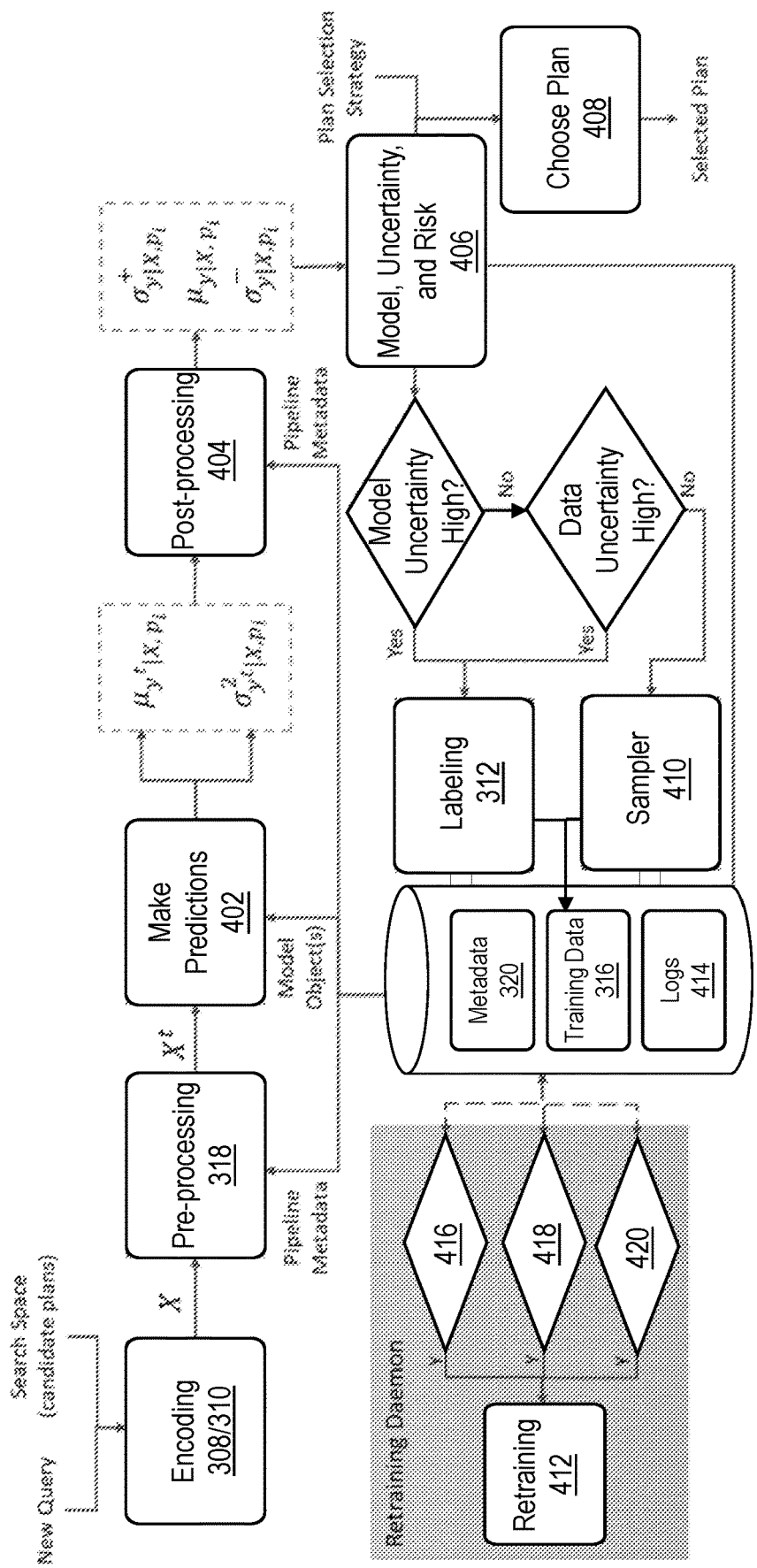
FIG. 4 depicts a block diagram of a model inference, feedback, and retraining pipeline for the query plan selection module of FIG. 1 in accordance with one or more embodiments.

As shown in FIG. 4, in some embodiments, a new query (e.g., input query) and a search space (e.g., alternative plans) go through encoding (query encoding 308 and plan encoding 310, respectively) and pre-processing 318 based on data transformation metadata 320 that was previously obtained in training.

In some embodiments, model object(s) are loaded from storage and used to score the encoded queries (make predictions 402). Since the learned cost model 200 is trained using transformed targets, the predictions must be inverse transformed via post-processing 404 to the original space to give the actual execution times at inference time. Note that the targets in the projection space have a close to normal distribution, which is defined by parameters $\mu_{y'|X, pi}^t$ and $\sigma_{y'|X, pi2}^t$. Observe, however, that the distribution in the original space is not symmetric and cannot be characterized by two parameters. Therefore, in some embodiments, for each prediction, three critical points of the conditional distribution are inverse transformed including $\mu_{y'|X, pi}^t - \sigma_{y'|X, pi}^t$, $\mu_{y'|X, pi}^t$, and $\mu_{y'|X, pi}^t + \sigma_{y'|X, pi}^t$. The bounds obtained in this way (i.e., $\mu_{y|X, pi} + \sigma_{y|X,pi}^+$ and $\mu_{y|X, pi} - \sigma_{y|X,pi}^-$) are equivalent to $\mu_{y t|X, pi} \pm \sigma_{y t|X, pi}$ in the normal space. In other words, when the predicted distributions are calibrated, with a sufficiently large set of data points this interval should contain the true value in about 68.27% of the cases, as is the case for a normal confidence interval of one standard deviation. Note that the distances between the subsequent critical points will give the upward and downward deviations from the mean in the original space: $\sigma_{y|X,pi}^+$ and $\sigma_{y|X,pi}^-$.

Then the model and data uncertainties as well as the suboptimality risk for each plan in the search space are computed as described previously (model, uncertainty, and risk 406). Then, given a plan selection strategy (such as one or more of the examples provided previously), one plan from the search space is selected for execution (choose plan 408).

In some embodiments, the uncertainty estimates and risks are also evaluated for retraining purposes. When either of model or data uncertainty are high (beyond predefined thresholds $\varphi_{mu}$ and $\varphi_{du}$ respectively), the sample is selected for generating more training data 316 for the next rounds of retraining. As such, the characteristics of the highly uncertain sample(s) are used to generate similar query-plan combinations that are labeled (labeling 312) and added to the training data 316. When the uncertainties are low, only the sample itself is added to the training data for future retraining (sampler 410).

In some embodiments, retraining is controlled by a retraining daemon 412 that monitors the logs 414 of query executions and uncertainty estimates. Retraining can be triggered by different events.

In some embodiments, retraining is trigged by model and/or data drift (block 416). In some embodiments, when the frequency of uncertain predictions (beyond $\varphi_{mu}$ and $\varphi_{du}$) becomes greater than a predefined threshold ($thr_u$), this is a signal that the model has become stale, and therefore retraining with the new training data is triggered.

In some embodiments, retraining is trigged by new data (block 418). In some embodiments, retraining triggers when the accumulated new training data becomes greater than a certain fraction ($fr_{tr}$) of total historical training data.

In some embodiments, retraining is trigged by time (block 420). In some embodiments, retraining is triggered when the time elapsed since the last training becomes greater than a certain threshold ($t_{tr}$).

Notably, while the above thresholds have a default setting, they can be customized by the user as needed.

Figure 5:
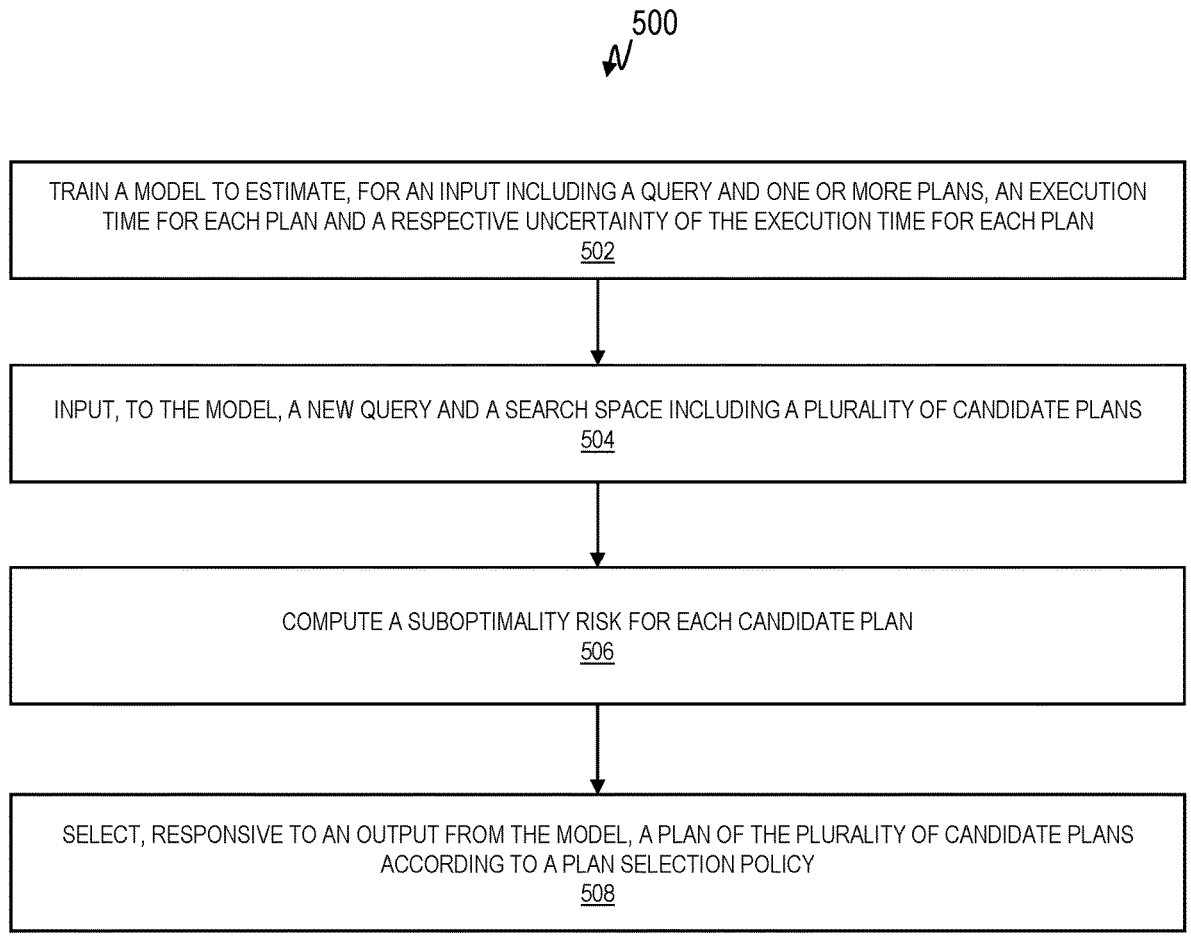
FIG. 5 is a flowchart in accordance with one or more embodiments of the present invention.

Referring now to FIG. 5, a flowchart 500 for providing robust query execution plan selection is generally shown according to an embodiment. The flowchart 500 is described in reference to FIGS. 1-4 and may include additional blocks not depicted in FIG. 5. Although depicted in a particular order, the blocks depicted in FIG. 5 can be rearranged, subdivided, and/or combined. In exemplary embodiments, the method 500 can be performed by a computing environment (e.g., computing environment 100 shown in FIG. 1).

At block 502, the method includes training a model to estimate, for an input comprising a query and one or more plans, an execution time for each plan and a respective uncertainty of the execution time for each plan.

At block 504, the method includes inputting, to the model, a new query and a search space including a plurality of candidate plans.

At block 506, the method includes, given an estimated distribution for the execution time of each candidate plan characterized by the estimated execution time and respective uncertainty, computing a suboptimality risk for each candidate plan compared to the other candidate plans. In some embodiments, suboptimality risk is defined as a ratio of a cost of the respective execution plan to a cost of an optimal execution plan.

At block 508, the method includes selecting, responsive to an output from the model, a plan of the plurality of candidate plans. In some embodiments, the plan is selected according to a plan selection policy. In some embodiments, the plan selection policy includes at least one of: selecting a plan by assuming that plans have higher costs proportional to an estimated standard deviation of their respective uncertainty; and selecting a plan with minimum risk using model uncertainty, data uncertainty, or a total uncertainty.

In some embodiments, the method includes pruning one or more plans based on a pruning policy according to one or more of the following: pruning plans in the search space having model uncertainty or data uncertainty greater than predetermined thresholds; and pruning plans in the search space having suboptimality risk greater than a predetermined threshold. In some embodiments, the pruning policy guarantees a final plan by preventing a plan from being pruned if there are no other candidate plans having one or more same properties as the respective plan.

In some embodiments, the method includes nominating one of a given sample and additional training data for retraining the model according to the model uncertainties.

In some embodiments, the method includes executing the new query using the selected plan of the plurality of candidate plans. In some embodiments, the new query is executed against a relational database using a relational database management system.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for robust query execution plan selection, the method comprising:
    training a model to estimate, for an input comprising a query and one or more plans, an execution time for each plan and a respective uncertainty of the execution time for each plan;
    inputting, to the model, a new query and a search space comprising a plurality of candidate plans;
    given an estimated distribution for the execution time of each candidate plan characterized by the estimated execution time and respective uncertainty, computing a suboptimality risk for each candidate plan compared to the other candidate plans, wherein suboptimality risk is defined as a ratio of a cost of the respective execution plan to a cost of an optimal execution plan; and
    selecting, responsive to an output from the model, a plan of the plurality of candidate plans, wherein the plan is selected according to a plan selection policy, wherein the plan selection policy comprises at least one of:
        selecting a plan by assuming that candidate plans have higher costs proportional to an estimated standard deviation of their respective model uncertainty, data uncertainty, or total uncertainty; and
        selecting a plan with minimum suboptimality risk using model uncertainty, data uncertainty, or a total uncertainty; and
    executing the new query using the selected plan of the plurality of candidate plans rather than an alternative plan having a lower execution time estimate, thereby limiting a maximum suboptimality of the execution time.

2. The computer-implemented method of claim 1, further comprising pruning one or more plans based on a pruning policy according to one or more of the following:
    pruning plans in the search space having model uncertainty or data uncertainty greater than predetermined thresholds; and
    pruning plans in the search space having suboptimality risk greater than a predetermined threshold.

3. The computer-implemented method of claim 2, wherein the pruning policy guarantees a final plan by preventing a plan from being pruned if there are no other candidate plans having one or more same properties as the respective plan.

4. The computer-implemented method of claim 1, further comprising nominating one of a given sample and additional training data for retraining the model according to the model uncertainties.

5. The computer-implemented method of claim 1, wherein the new query is executed against a relational database using a relational database management system.

6. A system having a memory, computer readable instructions, and one or more processors for executing the computer readable instructions, the computer readable instructions controlling the one or more processors to perform operations comprising:

training a model to estimate, for an input comprising a query and one or more plans, an execution time for each plan and a respective uncertainty of the execution time for each plan;

inputting, to the model, a new query and a search space comprising a plurality of candidate plans;

given an estimated distribution for the execution time of each candidate plan characterized by the estimated execution time and respective uncertainty, computing a suboptimality risk for each candidate plan compared to the other candidate plans, wherein suboptimality risk is defined as a ratio of a cost of the respective execution plan to a cost of an optimal execution plan; and selecting, responsive to an output from the model, a plan of the plurality of candidate plans, wherein the plan is selected according to a plan selection policy, wherein the plan selection policy comprises at least one of:

selecting a plan by assuming that candidate plans have higher costs proportional to an estimated standard deviation of their respective model uncertainty, data uncertainty, or total uncertainty; and selecting a plan with minimum suboptimality risk using model uncertainty, data uncertainty, or a total uncertainty; and executing the new query using the selected plan of the plurality of candidate plans rather than an alternative plan having a lower execution time estimate, thereby limiting a maximum suboptimality of the execution time.

7. The system of claim 6, further comprising pruning one or more plans based on a pruning policy according to one or more of the following:

pruning plans in the search space having model uncertainty or data uncertainty greater than predetermined thresholds; and pruning plans in the search space having suboptimality risk greater than a predetermined threshold.

8. The system of claim 7, wherein the pruning policy guarantees a final plan by preventing a plan from being pruned if there are no other candidate plans having one or more same properties as the respective plan.

9. The system of claim 6, further comprising nominating one of a given sample and additional training data for retraining the model according to the model uncertainties.

10. The system of claim 6, wherein the new query is executed against a relational database using a relational database management system.

11. A computer program product comprising a non-transitory computer readable storage medium having program instructions embodied therewith, the program instructions executable by one or more processors to cause the one or more processors to perform operations comprising:

training a model to estimate, for an input comprising a query and one or more plans, an execution time for each plan and a respective uncertainty of the execution time for each plan;

inputting, to the model, a new query and a search space comprising a plurality of candidate plans;

given an estimated distribution for the execution time of each candidate plan characterized by the estimated execution time and respective uncertainty, computing a suboptimality risk for each candidate plan compared to the other candidate plans, wherein suboptimality risk is defined as a ratio of a cost of the respective execution plan to a cost of an optimal execution plan; and selecting, responsive to an output from the model, a plan of the plurality of candidate plans, wherein the plan is selected according to a plan selection policy, wherein the plan selection policy comprises at least one of:

selecting a plan by assuming that candidate plans have higher costs proportional to an estimated standard deviation of their respective model uncertainty, data uncertainty, or total uncertainty; and selecting a plan with minimum suboptimality risk using model uncertainty, data uncertainty, or a total uncertainty; and executing the new query using the selected plan of the plurality of candidate plans rather than an alternative plan having a lower execution time estimate, thereby limiting a maximum suboptimality of the execution time.

12. The computer program product of claim 11, further comprising pruning one or more plans based on a pruning policy according to one or more of the following:

pruning plans in the search space having model uncertainty or data uncertainty greater than predetermined thresholds; and pruning plans in the search space having suboptimality risk greater than a predetermined threshold.

13. The computer program product of claim 12, wherein the pruning policy guarantees a final plan by preventing a plan from being pruned if there are no other candidate plans having one or more same properties as the respective plan.

14. The computer program product of claim 11, further comprising nominating one of a given sample and additional training data for retraining the model according to the model uncertainties.

15. The computer program product of claim 11, wherein the new query is executed against a relational database using a relational database management system.

* * * * *